TAP-CHANGING THYRISTOR CIRCUITRY FOR REGULATING TRANSFORMERS

Filed Feb. 26, 1968 2 Sheets-Sheet 1

INVENTOR:

Manfred Matzl by Erwin Salzer, Atty.

March 24, 1970 M. MATZL 3,502,961

TAP-CHANGING THYRISTOR CIRCUITRY FOR REGULATING TRANSFORMERS

Filed Feb. 26, 1968 2 Sheets-Sheet 2

INVENTOR:

Manfred Matzl by Erwin Salzer, Atty.

United States Patent Office 3,502,961

Patented Mar. 24, 1970

3,502,961

TAP-CHANGING THYRISTOR CIRCUITRY FOR REGULATING TRANSFORMERS

Manfred Matzl, Regensburg-Zeitlarn, Germany, assignor to Maschinenfabrik Reinhausen Gebruder Scheubeck K.G., Regensburg, Germany Filed Feb. 26, 1968, Ser. No. 708,085
Claims priority, application Germany, Mar. 3, 1967,
Int. Cl. H02m *5/10, 5/22*
U.S. Cl. 323—43.5 12 Claims

ABSTRACT OF THE DISCLOSURE

A tap-changing thyristor circuitry for regulating transformers which makes it possible to perform tap-changing operations without formation of electric arcs between relatively movable contacts. The circuitry includes at least one load thyristor shunted by an auxiliary thyristor and a commutating capacitor or turn-off capacitor, the auxiliary thyristor and the capacitor being connected in series. The particular circuitry requires a minimum of circuit-elements, is very compact, and its manufacture involves relatively low cost.

BACKGROUND OF THE INVENTION

This invention is in some respect an improved version of the circuitry disclosed and claimed in the copending patent application Ser. No. 619,228 of Manfred Matzl, filed Feb. 2, 1967, now U.S. Patent No. 3,437,913 for Tapped Regulating Transformer Having Thyristor Transfer Switch Means, and the copending patent application Ser. No. 628,490 of Manfred Matzl, filed Apr. 4, 1967 for Logig-Unit-Controlled Thyristor Tap-Changing Transfer Switch Having Trigger Impulse Amplifier. Reference may be had to these applications in regard to details which are but diagrammatically treated in the present disclosure, e.g. the circuitry of trigger pulse generators, and bistable control circuits.

Another circuitry related to the circuitry disclosed below is disclosed in Swiss Patent 413,098. The circuitry disclosed in that patent includes among the means for short-circuiting contiguous taps of a tapped transformer winding a mechanical switch and a load thyristor which are connected in parallel. A short-circuit is established by closing the mechanical switch which is connected in parallel with the thyristor. The ensuing short-circuit current is commutated, or transferred, to the thyristor and thus interrupted by forced commutation. These steps involve a relatively long interval of time, i.e. the short-circuit current is allowed to rise for a relatively long period of time until interrupted by forced commutation. Hence the short-circuit current may become excessively high before being interrupted. Forced commutation is initiated by the action of an auxiliary mechanical switch. The times of operation of the short-circuiting thyristor-shunting switch and of the aforementioned auxiliary switch must be precisely coordinated. This involves serious and costly complications. The circuitry according to Swiss Patent 413,018 requires at least four thyristors or, if but two thyristors are being used, a correspondingly larger amount of mechanical control means are required. It is, therefore, one of the principal objects of this invention to provide a novel tap-changing thyristor circuitry performing the function of a transfer switch which is not subject to the aforementioned limitations.

SUMMARY OF THE INVENTION

A tap-changing thyristor circuitry for regulating transformers embodying this invention includes a pair of jointly movable disconnect change-over switches each having a primary contact means to be connected to a pair of contiguous taps of a tapped transformer winding, and each having a pair of secondary contact means for selectively connecting each of a pair of circuit branches to either of said pair of taps. Said pair of circuit branches include a first branch having one end connected to said one of said pair of secondary contact means of each of said pair of disconnect change-over switches, and it includes a load thyristor shunted by a shunt. The shunt includes an auxiliary thyristor and a commutating capacitor which are connected in series. A D-C power supply is connected to the commutating capacitor for charging the latter. The aforementioned pair of circuit branches further includes a second branch having one end connected to the other of said pair of secondary contact means of each of said pair of disconnect change-over switches. Said second branch includes a short-circuiting switch having a pair of relatively movable contacts for short-circuiting said pair of taps of a tapped transformer winding. A load current-carrying conductor is conductively connected to the other end of said first branch and to the other end of said second branch. The circuitry further includes means for triggering said load thyristor and means operative upon triggering said load thyristor for triggering said auxiliary thyristor to cause discharge of said commutating capacitor and turn-off of said load thyristor.

DESCRIPTION OF PREFERRED EMBODIMENTS OF THE INVENTION

Figure 1:
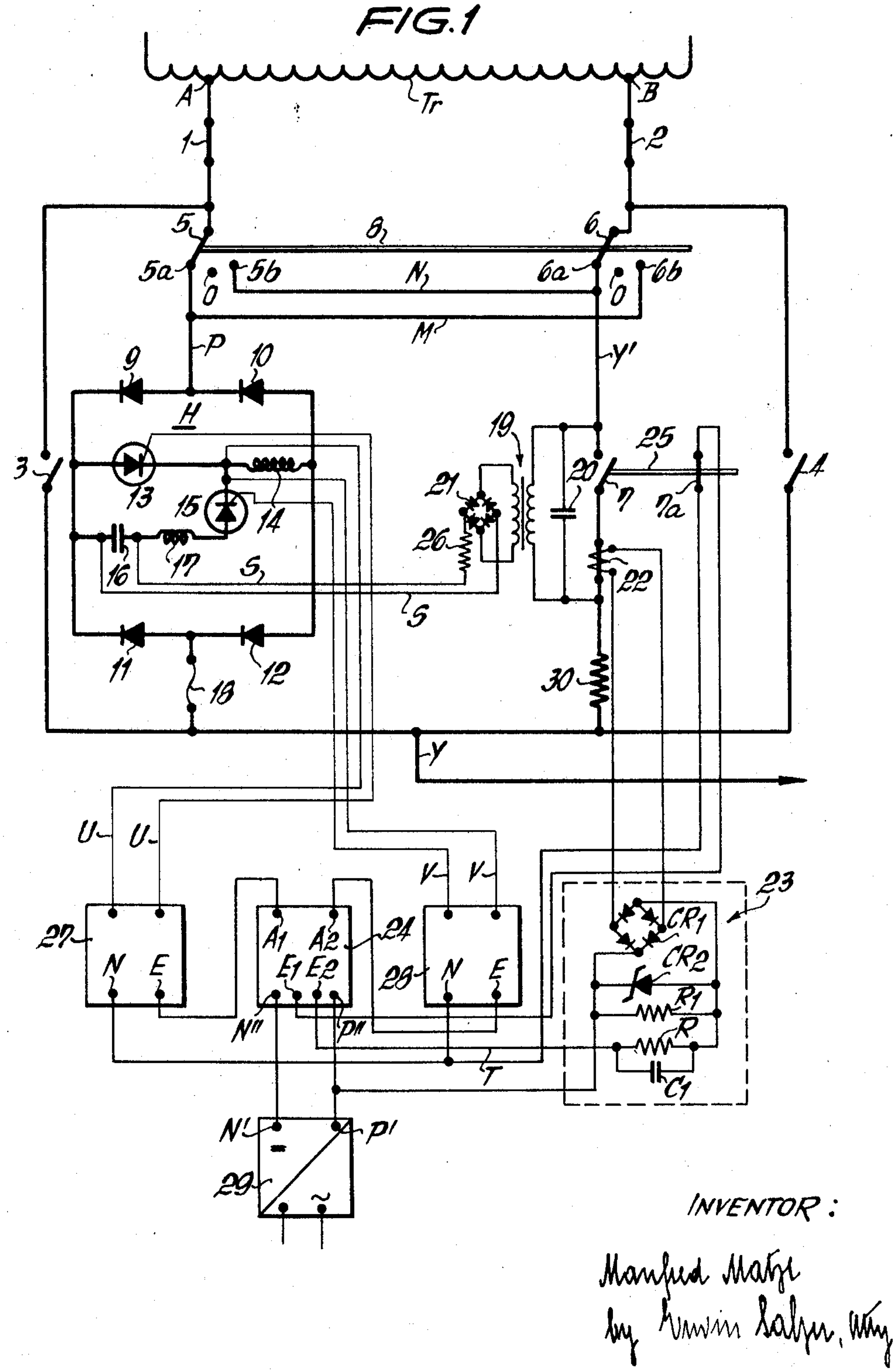
FIG. 1 is a circuit diagram of a tap-changing circuitry embodying the present invention.

Referring now to FIG. 1, character *Tr* has been applied to indicate the tapped winding of a transformer. Winding *Tr* is provided with two contiguous spaced taps A and B. The circuitry shown in FIG. 1 is adapted to switch a load from tap A to tap B, and vice versa. Actually any tapped transformer winding has a larger number of taps than but two taps, and this requires the use of a selector switch which has not been shown in FIG. 1. The use of selector switches is well known in the art, and, therefore, does not need to be disclosed in the context. A circuit including a multitapped transformer winding, a selector switch and a tap-changing switch is disclosed in U.S. Patent 3,176,089 to A. Bleibtreu et al., Mar. 30, 1965 for Load Tap Changers for Transformers, and reference may be had to this patent in regard to the use of selector switches for making it possible to effect changes between a larger number of taps than two. FIG. 1 shows instead of a complete complex selector switch two selector switch elements 1 and 2 making it possible to select between taps A and B of winding *Tr*. Reference character Y has been applied to an outgoing line or load-current-carrying conductor which may selectively be connected to either tap A, or tap B. There are two parallel current paths from tap A to outgoing line Y, and one of these parallel current paths includes the current-carrying switch 3. There are two parallel current paths from tap B to outgoing line Y and one of these current paths includes the current-carrying switch 4. Current-carrying switches 3 and 4 are not designed to open while carrying currents. They carry the entire load current during the periods of time when the transformer is in a stationary state, i.e. when no tap-changing operation is being performed.

Reference character H has been applied to generally indicate a solid-state circuit which extends parallel to current-carrying switch 3, and is capable of conductively connecting either tap A, or tap B, with the outgoing line Y, as will be explained below more in detail. Reference numeral 5 has been applied to generally indicate a disconnect change-over switch interposed between tap A and solid state circuit H. Disconnect change-over switch 5 has two limit positions established by its fixed secondary contact means 5*a* and 5*b*, and an intermediate or neutral position established by its fixed contact O. Lead Y' conductively interconnects tap B and selector switch element 2 with load-current-carrying or outgoing line Y. Switches 6 and 7 are interposed in lead Y'. Switch 6 is a change-over disconnect switch having two limit positions established by fixed contacts or secondary contact means 6*a* and 6*b*, and an intermediate or neutral position established by its fixed contact O. Switches 5, 6 have primary contact means which are selectively pivotable into engagement with secondary contact means 5*a*, 5*b*, and 6*a*, 6*b*, respectively. Disconnect switches 5 and 6 are tied together for joint operation by a tie bar 8. Contact means 5*a* and 6*b* of change-over disconnects 5, 6 are conductively interconnected by leads including lead M. In a like fashion contact means 5*b* and 6*a* of change-over disconnects 5, 6 are conductively interconnected by leads including lead N. Short-circuiting switch 7 is provided with means precluding rebounce of its movable contact in order to obtain as positive operation as possible of this switch. It will be apparent from the foregoing that the solid state circuit H is not current-carrying when change-over disconnects 5, 6 are in their intermediate or neutral positions. Then the load current flows either from tap A through switch 3 to outgoing line Y, or from tap B through switch 4 to outgoing line Y.

The particular solid state circuit of FIG. 1 is, in substance, a single-phase full-wave rectifier bridge including four diodes 9, 10, 11, 12. The D-C output terminals of the above rectifier bridge are conductively interconnected by load thyristor 13 and by choke 14 which are both connected in series. Load thyristor 13 is shunted by auxiliary thyristor 15. The latter is arranged in series with commutating or turn-off capacitor 16, and current-limiting choke 17. One of the A-C terminals of the above rectifier bridge is conductively connected to contacts 5*a* and 6*b* of change-over disconnects 5, 6 by leads including leads P, M. The other of the A-C terminals of the above rectifier bridge is conductively connected to outgoing line Y by lead R and fusible protective device or fuse 18. Commutating capacitor 16 is being charged by a D-C power supply including transformer 19 and rectifier bridge 21. The primary winding of transformer 19 is shunted across short-circuiting switch 7, and the secondary winding of transformer 19 energizes the full wave rectifier 21 which, in turn, charges capacitor 16. One of the leads S conductively connecting rectifier 21 and capacitor 16 includes resistor 26. The primary winding of transformer 19 is shunted by capacitor 20. Parts 19 and 21 are an auxiliary D-C power supply for charging capacitor 16. Any other appropriate auxiliary D-C power supply may be substituted for the specific auxiliary power supply 19, 21 shown in FIG. 1.

Reference numeral 22 has been applied to indicate a transformer energized by the current flowing in lead Y'. Transformer 22 energizes a current sensing device generally indicated by reference numeral 23. The current sensing device 23 includes bridge rectifier CR1 the Zener diode CR2, resistors R1 and R2 of which the latter is shunted by capacitor C1. Current supplied by the secondary winding of transformer 22 is rectified by rectifier CR1. This establishes a voltage drop along resistor R1. This voltage drop is limited by Zener diode CR2. The voltage drop along resistor R1 is transmitted by circuit elements R2 and C1 to the input terminal E of the bistable circuitry 24. As a result the current sensing device senses the instantaneous or momentary values of the current in the secondary winding of the transformer, and the first derivative of the latter.

Current-sensing device 23 emits a signal whenever taps A and B of winding T*r* are short-circuited. This signal is transmitted to the bistable circuit 24 to trigger the latter from one of its stable states to the other.

Reference numeral 7*a* has been applied to indicate an auxiliary switch which is tied by a tie bar 25 to switch 7 to cause joint movement of switches 7 and 7*a*. When switch 7 is in the closed position thereof, switch 7*a* is in its open position, and vice versa.

Reference numerals 27 and 28 are applied to indicate a pair of triggering pulse generators supplied with D-C power from a power supply 29 having D-C terminals N', P'. Power supply 29 further energizes the above referred-to bistable circuit 24 being connected to its terminals N'', P''. Bistable circuit 24 has two output terminals $A_1$ and $A_2$ of which the former is conductively connected to the input terminal E of pulse generator 27, and the latter is conductively connected to the input terminal E of pulse generator 28. Bistable circuit 24 has two input terminals $E_1$ and $E_2$. The former forms part of a circuit controlled by auxiliary switch 7*a*, and the latter is conductively connected to current sensing device 23 by means of lead T.

At the initiation of a tap-changing operation auxiliary switch 7*a* is closed and bistable circuit 24 renders pulse generator 27 operative which, in turn, triggers load thyristor 13. When switch 7 is closed and current sensing device 23 energized by transformer 22, current sensing device 23 emits a signal causing bistable circuit 24 to render pulse generator 27 inoperative and to render the pulse generator 28 operative which triggers thyristor 15, causing turn-off of thyristor 13.

To achieve the above a pair of leads U conductively connect the output terminals of pulse generator 27 to load thyristor 13, and a pair of leads V conductively connects pulse generator 28 to auxiliary thyristor 15.

Reference character 30 has been applied to indicate a resistor which may be arranged in lead Y' to limit the magnitude of the short-circuit current which occurs when taps A and B of winding T*r* are short-circuited.

Figure 2:
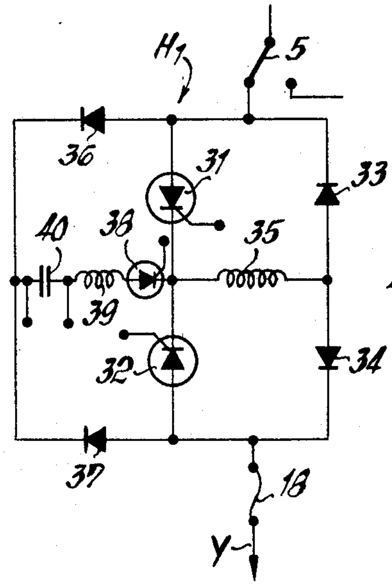
FIGS. 2 to 4, inclusive, are circuit diagrams of solid-state circuits for performing tap-changing operations which may be substituted in the circuitry of FIG. 1 for the solid-state circuit of FIG. 1 performing the same function.

In FIG. 2 reference character $H_1$ has been applied to generally indicate a solid state circuitry which may take the place in FIG. 1 of the solid state circuitry H of FIG. 1. In a like fashion reference character $H_2$ has been applied in FIG. 3 to indicate a solid state circuitry which may take the place of the solid state circuitry H of FIG. 1, and in FIG. 4 reference character $H_3$ has been applied to generally indicate a solid state circuitry which may take the place in the arrangement of FIG. 1 of the solid state circuitry H thereof.

Referring now to FIG. 2, the circuit shown therein is, in essence, a single-phase full-wave bridge circuit including two load thyristors 31, 32 having back-to-back connected cathodes, and two diodes having back-to-back connected anodes. The D-C terminals of the aforementioned bridge circuit are conductively interconnected by choke coil 35. A dual commutating or turn-off circuit is operatively related to the above described bridge circuit. The former includes two diodes 36, 37, auxiliary thyristor 38, current-limiting choke 39 and pre-loaded commutating or turn-off capacitor 40. Choke 39 connects the positive pole of capacitor 40 to the anode of auxiliary thyristor 38.

Figure 3:
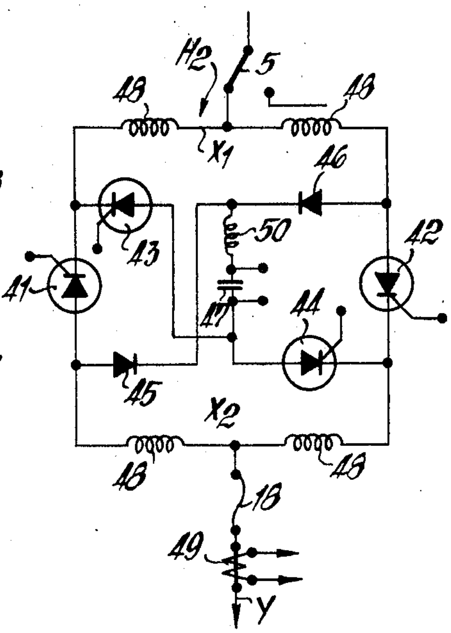

The solid state circuitry $H_2$ of FIG. 3 includes two load thyristors 41, 42 inversely connected in parallel, each allowing the flow of current in an opposite direction. The circuit of FIG. 3 further includes turn-off or commutating means, i.e. the two auxiliary thyristors 43 and 44, the two diodes 45 and 46, the current-limiting choke 50 and commutating capacitor 47. Capacitor 47 and choke 50 are connected in series with each of auxiliary thyristors 43, 44 and parts 47, 50 are connected in parallel to either load thyristor 41 and 42. The positive terminal of commutating capacitor 47 is conductively connected by means of auxiliary thyristor 43 to the cathode of load thyristor 41. In like fashion the positive terminal of commutating capacitor 47 is conductively connected by means of auxiliary thyristor 44 to the cathode of load thyristor 42. Reference character 48 has been applied to indicate chokes of which a pair is included in leads $X_1$ and another pair in leads $X_2$. The midpoint between chokes 48 in leads $X_2$ is conductively connected by the intermediary of a quick acting fuse 18 to the load-current-carrying or outgoing line Y. Outgoing line Y is provided with a current transformer 49 which has a secondary winding conductively connected to pulse generator 28. Transformer 49 controls the triggering of auxiliary thyristors 43, 44 when the load thyristors 41 and 42, respectively, are current-carrying. The current transformer 49 is a device responsive to the direction of current flow that allows but triggering of that auxiliary thyristor 43, 44 whose load thyristor 41 and 42 is current-carrying at the particular point of time.

Figure 4:
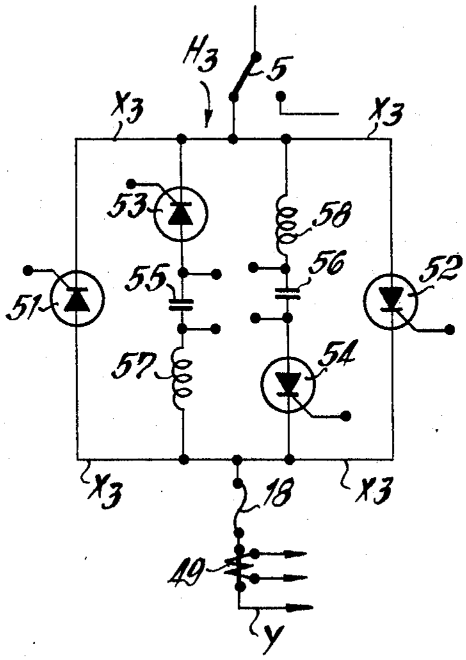

The circuitry $H_3$ of FIG. 4 includes two load thyristors 51, 52 which are inversely connected in parallel so that the current flow across each of thyristors 51, 52 occurs in opposite directions. Each load thyristor 51, 52 is shunted by a plurality of serially connected circuit elements. Thus load thyristor 51 is shunted by auxiliary thyristor 53, commutating turn-off capacitor 55 and choke 57, and load thyristor 52 is shunted by auxiliary thyristor 54, turn-off or commutating capacitor 56 and choke 58. Turn-off capacitors 55, 56 are pre-charged and polarized in such a way that their positive terminals are conductively connected to the cathode of the respective load thyristor 51, 52 following triggering of the respective auxiliary thyristor 53, 54. The current flowing through lead $X_3$ and load-current-carrying or outgoing conductor Y is under the control of fast acting or fast blowing fuse 18, and energizes current transformer 49. The secondary winding of transformer 49 is connected to impulse generator 28 and operates in the fashion set forth in connection with the description of FIG. 3.

Assuming that it is intended to disconnect tap A of FIG. 1 from the outgoing line Y and to connect tap B of FIG. 1 with the outgoing line Y. In the initial position when tap A is connected to outgoing line Y the selector switch element 1 is closed, and the same applies in regard to the current-carrying switch or pair of contacts 3. Selector switch element 2 is closed preparatory to connecting tap B to outgoing line Y, but current-carrying switch or pair of contacts 4 open. In that initial state of the circuitry of FIG. 1 the entire load current flows from tap A, through selector switch element 1 and current-carrying switch or pair of contacts 3 to outgoing line Y, and both disconnect change-over switches 5, 6 are in their intermediate or neutral positions, i.e. the movable contact arms thereof are in engagement with the fixed contacts O thereof.

Occurrence of a tap changing signal causes both disconnects to pivot in clockwise direction, as seen in FIG. 1, so that their movable contact arms are in engagement with the fixed contacts or secondary contact means *5a* and *6a*, respectively. The means which may be used for operating disconnects 5, 6 in the aforementioned fashion are well known in the art and do not need to be described in this context. Normally closed auxiliary switch *7a* causes bistable device 24 to assume a state causing pulse generator 27 to be operative, thus triggering load thyristor 13. When current-carrying switch or pair of contacts 3 is opened—which is achieved by conventional contact operating means not shown in FIG. 1—the entire load current is being carried by solid state circuitry H. The entire load current either flows from tap A through switch 5, through diode 9, load thyristor 13, choke 4 diode 12, lead R and fuse 18 to outgoing line Y; or the entire load current flows in opposite direction from outgoing line Y through fuse 18, lead R, diode 11, load thyristor 13, choke 14, diode 10, disconnect change-over switch 5, and selector switch element 1 to tap A of winding T*r*. Switch 7 is closed following opening of current-carrying switch 3. Operation of short-circuiting switch 7 in the aforementioned sequence is achieved by means well known in the art which need not to be described in this context. Switch 7 is designed to minimize rebound of the contacts thereof, or to virtually make such rebound impossible. Closing of switch 7 short-circuits the turns of the transformer winding T*r* which are situated between taps A and B thereof. The short-circuit current established by short-circuiting some turns of winding T*r* may have a tendency of rising at a very rapid rate. Because of its tendency to rise at a very rapid rate the short-circuit current ought to be interrupted within a few microseconds by the action of load thyristor 13. This is achieved by current transformer 22 which is free from any significant time lag and by current-sensing device 23. The latter converts the A-C signal emitted from current-transformer 22 into a D-C signal fed to the input terminal $E_2$ of bistable device 24. As a result, the bistable device 24 is caused to change from one of its stable states causing pulse generator 27 to be operative to the other of its stable states causing pulse generator 27 to be rendered inoperative, and pulse generator 28 to be rendered operative. As a result of the fact that pulse generator 28 is rendered operative the latter triggers auxiliary thyristor 15 by one single trigger pulse. This allows discharge of commutating capacitor 16 through choke 17, auxiliary thyristor 15 and load thyristor 13 carrying the load current. This discharge is effected in a very short period of time. The flow of the load current and of the current resulting from the discharge of capacitor 16 are of opposite directions. When the sum of both currents is zero, the load thyristor 13 begins to turn off. The magnitude of the reverse voltage impressed upon the load thyristor 13 depends on the voltage then prevailing across capacitor 16.

The voltage prevailing between taps A and B of winding T*r*, the inductance of the short-circuited portion of the circuit, the load current component and the short-circuit current component flowing in the short-circuited portion of the circuit establish a tendency of continued current flow through load thyristor 13, and a tendency of reversing the polarity of capacitor 16. Capacitor 16 must have such dimensions as not to change its polarity during the turn-off time of thyristor 13, i.e. the shortest interval between the time when forward current reaches zero and the time when the thyristor is able to block reapplied forward voltage without turning on. Choke 14 precludes discharge of commutating capacitor 16 through diode branches 9, 10 and 11, 12 respectively.

When commutation by solid state circuitry H has safely been achieved, current-carrying contact or current-carrying switch 4 is closed, and change-over disconnect switch 5, 6 are moved to their intermediate or neutral positions. Thereupon switch 7 is being opened. This completes the tap-changing operation from tap A to tap B of winding T*r*.

Changing from tap B to tap A of winding T*r* is effected in a similar fashion. If a change from tap B to tap A is intended, the change-over disconnect switches 5, 6 are moved from their neutral positions, or intermediate positions, in counterclockwise direction, as seen in FIG. 1, so that the pivotable contact arms thereof engage fixed contacts *5b* and *6b*, respectively. As a result, the solid state circuitry H is being connected to tap B of winding T*r*. In other words, the solid state circuitry H is always connected to the tap at which it is intended to interrupt the load current.

If the short-circuit current resulting from short-circuiting taps A and B of winding T*r* is not properly interrupted by the operation of the solid state circuitry H, the short-circuit current rises beyond a predetermined permissible value, and this causes blowing of the fast acting fuse 18. Blowing of the fuse 18 may operate an interlocking device, or lock-out device (not shown), precluding further or additional initiation of tap-changing operations. Blowing of fuse 18 may also energize a signalling circuit which dedicates that the tap-changing circuitry is out of order, and needs inspection and repair.

The voltage drop across the solid state device H shown in FIG. 1 may be relatively large. The solid state devices $H_1$, $H_2$ and $H_3$ shown in FIGS. 2 to 4 which may take the place of the solid state device H of FIG. 1 are designed to reduce the voltage drop which may prevail across the same.

Referring now to FIG. 2, the load current flows either from change-over disconnect switch 5, load transistor 31, choke 35 and fuse 18 to outgoing line Y, or in opposite direction from outgoing line Y through fuse 18, load thyristor 32 and diode 33 to change-over disconnect switch 5. The commutating means for load thyristors 31 and 32 are arranged to the left of the above bridge circuit, and include diodes 36, 37, commutating capacitor 40, auxiliary thyristor 38 and current-limiting choke 39. The commutating capacitor 40 is intended to be charged by an auxiliary D-C power supply (not shown), and the required polarity of capacitor 40 has been indicated in FIG. 2 by + and — symbols. Auxiliary thyristor 38 requires a smaller power rating than load thyristors 31 and 32. Triggering of auxiliary thyristor 38 causes discharge of commutating capacitor 40 through either of the load thyristors 31 or 32, whichever of the two load thyristors 31, 32 may be carrying the load current at the particular point of time, and this results in turn-off of the respective load thyristor 31, 32.

The circuitry of FIG. 3 results in a particularly small voltage drop across solid state circuit $H_2$ including the two load thyristors 41, 42 and a commutating circuitry made up of two auxiliary thyristors 43, 44, two diodes 45, 46, commutating capacitor 47, and current-limiting choke 50. The commutating capacitor 47 is being charged by an auxiliary D-C power supply (not shown), and the required polarity of the charge has been indicated in FIG. 3 by + and — symbols. Triggering of either auxiliary thyristors 43, 44 results in a discharge of commutating capacitor 47 through either load thyristor 41, or load thyristor 42, and turning off of the load transistor which is carrying current at the particular point of time.

As explained above more in detail, the circuitry $H_3$ of FIG. 4 includes the two load thyristors 51, 52, the two auxiliary thyristors 53, 54, two commutating capacitors 55, 56, and two current-limiting chokes 57, 58. Capacitors 55, 56, are charged by an auxiliary D-C power supply (not shown) in such a way that their positive terminals are directly connected to the cathodes of the respective load thyristor 51, 52 to which they are operatively related whenever the intermediate auxiliary thyristor 53 and 54, respectively, is being triggered. This results, in turn, in rapid turn-off of the respective load thyristors 51, 52.

The circuitry of FIGS. 3 and 4 calls for a somewhat different control than the circuitry of FIGS. 1 and 2. When the bistable device 24 of FIG. 1 is caused to change from one of its stable states to the other, only one of the auxiliary thyristors 43, 44 (FIG. 3) or 53, 54 (FIG. 4), ought to be triggered, i.e. the auxiliary thyristor which is operatively related to a load thyristor carrying current at the particular point of time. Therefore the instantaneous direction of current flow must be sensed, and the triggering of the auxiliary thyristors made dependent upon the direction of current flow. Transformer 49 of FIGS. 3 and 4 is a device for sensing the direction of current flow. The secondary winding of current transformer 49 gives a signal to pulse generator 28 whose direction depends upon the direction of current flow through solid state devices $H_2$ and $H_3$, respectively, causing the latter to allow only triggering of the particular auxiliary thyristor which is operatively related to a current-carrying load thyristor. In other words, pulse generator 28 triggers but one of the two auxiliary thyristors of the circuitry of FIGS. 3 and 4, namely the auxiliary thyristor whose corresponding main or load thyristor is carrying current at the particular instant. The other auxiliary thyristor whose corresponding load or main thyristor is not carrying current at the particular instant is rendered ineffective by means well known in the art included in pulse generator 28, not shown. The auxiliary thyristor that should not be triggered may be rendered ineffective by a pair of transistors forming part of pulse generator 28, the basis-emitter circuits of these two transistors being energized by the current flowing through the secondary circuit of current transformer 49. Selectivity in regard to the direction of current flow is achieved by providing a pair of diodes in the base-emitter circuits of the aforementioned pair of transistors. The first of these diodes renders the respective transistor conductive only if the current wave in the secondary circuit of transformer 49 is positive, and the second of these diodes renders the respective transistor conductive only if the current wave in the secondary circuit of transformer 49 is negative. Thus selectivity is achieved by triggering but one ofthe auxiliary thyristors 42, 43 (FIG. 3), or 51, 52 (FIG. 4), whose main or load thyristor 41, 42 (FIG. 3), or 51, 52 (FIG. 4), respectively, is current-carrying at the particular point of time.

It will be apparent from the foregoing that the semiconductor device circuitry $H_1$, $H_2$ and $H_3$ of FIGS. 2–4, inclusive, may readily be substituted in FIG. 1 for the semi-conductor device circuitry H shown in FIG. 1. Thus the basic tap-changing circuitry of FIG. 1 may be supplemented by the semiconductor circuitry $H_1$, $H_2$ or $H_3$ which is most appropriate for the particular circumstance at hand.

While there has been described what is at present considered to be the preferred embodiment of the invention, it will be obvious to those skilled in the art that various changes and modifications may be made without departing from the invention, and it is, therefore, aimed to cover all such changes and modifications as fall within the true spirit and scope of the invention.

What is claimed is:

1. A tap-changing thyristor circuitry for regulating transformers including in combination (a) a pair of jointly movable disconnect change-over switches each having a primary contact means to be connected to a pair of contiguous taps of a tapped transformer winding and each having a pair of secondary contact means for selectively connecting each of a pair of circuit branches to either of said pair of taps;

(b) said pair of circuit branches including a first branch having one end connected to said one of said pair of secondary contact means of each of said pair of disconnect change-over switches, and said first branch further including a load thyristor shunted by a shunt including an auxiliary thyristor and a commutating capacitor being connected in series;

(c) a D-C power supply connected to said commutating capacitor for charging said commutating capacitor;

(d) said pair of circuit branches further including a second branch having one end connected to the other of said pair of secondary contact means of each of said pair of disconnect change-over switches and said second branch including a short-circuiting switch having a pair of relatively movable contacts for short-circuiting said pair of taps of said winding;

(e) a load current-carrying conductor conductively connected to the other end of said first branch and to the other end of said second branch;

(f) means for triggering said load thyristor; and (g) means operative upon triggering said load thyristor for triggering said auxiliary thyristor to cause discharge of said commutating capacitor and turn-off of said load thyristor.

2. A tap-changing thyristor circuitry as specified in claim 1 wherein said auxiliary thyristor is designed to have a smaller power rating than said load thyristor.

3. A tap-changing thyristor circuitry as specified in claim 1 wherein said first branch includes a single-phase full-wave diode rectifier bridge having a pair of A-C terminals and a pair of D-C terminals, one of said pair of A-C terminals being conductively connected to said one of said pair of secondary connecting means of each pair disconnect change-over switches and the other of said pair of A-C terminals being conductively connected to said load-current carrying conductor, said pair of D-C terminals being interconnected by said load thyristor and a first choke connected in series with said load thyristor, said load thyristor being shunted by a shunt including said auxiliary thyristor, said commutating capacitor, and a second choke.

4. A tap-changing thyristor circuitry as specified in claim 1 wherein said first branch includes a single-phase full-wave rectifier bridge having a pair of load thyristors with back-to-back connected anodes and a pair of diodes with back-to-back connected anodes, said rectifier bridge having a pair of A-C terminals and a pair of D-C terminals, one of said pair of A-C terminals being conductively connected to said one of said pair of secondary connecting means of each of said pair of disconnect change-over switches and the other of said pair of A-C terminals being conductively connected to said load-current-carrying conductor, said pair of D-C terminals being conductively interconnected by a first choke, and a pair of shunts one for each of said pair of load thyristors, each of said pair of shunts including a separate diode, said auxiliary thyristor, said commutating capacitor and a second choke being common to each of said pair of shunts.

5. A tap-changing thyristor circuitry as specified in claim 1 wherein said first branch includes (a) a pair of load thyristors inversely connected in parallel;
(b) a first pair of chokes interconnecting an anode and a cathode of said pair of load thyristors;
(c) a second pair of chokes interconnecting another anode and another cathode of said pair of load thyristors;
(d) means conductively connecting a point between said first pair of chokes to one of said secondary pair of connecting means of each of said pair of disconnect switches;
(e) means conductively connecting a point between said second pair of chokes to said load-current-carrying conductor;
(f) a pair of shunts each across one of said pair of load thyristors, each of said pair of shunts including an auxiliary thyristor, a diode, a commutating capacitor and an additional choke connected in series, said commutating capacitor and said additional choke being common to each of said pair of shunts, said auxiliary thyristor of each of said pair of shunts connecting one terminal of said commutating capacitor with the cathode of each of said pair of load thyristors; and
(g) said D-C power supply being connected to said commutating capacitor to impart a positive charge to said one terminal thereof.

6. A tap-changing thyristor circuitry as specified in claim 5 including (a) a current transformer having a primary circuit energized by the current flowing through said first branch and having a secondary circuit;
(b) a pulse generator for triggering said auxiliary thyristor in each of said pair of shunts; and
(c) means under the control of said secondary circuit of said current transformer for controlling the trigger pulses of said pulse generator to allow at any given point of time triggering of said auxiliary thyristor in only one of said pair of shunts shunting one of said pair of load thyristors that is carrying current at said given point of time.

7. A tap-changing thyristor circuitry as specified in claim 1 including (a) a pair of load thyristors inversely connected in parallel;
(b) means conductively connecting the anode of one of said pair of load thyristors and means for conductively connecting the cathode of the other of said pair of load thyristors to one of said secondary pair of connecting means of each of said pair of disconnect switches;
(c) means conductively connecting the cathode of said one of said pair of load thyristors and means for conductively connecting the anode of said other of said pair of load thyristors to said load-current-carrying conductor;
(d) a first auixiliary thristor, a first commutating capacitor and a first choke connected in series and shunting one of said pair of load thryistors, said first auxiliary thyristor having a cathode directly connected to the cathode of one of said pair of load thyristors;
(e) a second auxiliary thyristor, a second commutating capacitor and a second choke connected in series and shunting the other of said pair of load thyristors, said second auxiliary thyristor having a cathode directly connected to the cathode of the other of said pair of load thyristors; and
(f) said D-C power supply being connected to said first commutating capacitor and to said second commutating capacitor to impart a positive charge to the terminal of said first commutating capacitor connected to the anode of said first auxiliary thyristor and to impart a positive charge to the terminal of said second commutating capacitor connected to the anode of said second auxiliary thyristor.

8. A tap-changing thyristor circuitry as specified in claim 6 including (a) a current transformer having a primary circuit energized by the current flowing through said first branch and having a secondary circuit;
(b) a pulse generator for triggering said first auxiliary thyristor and for triggering said second auxiliary thyristor; and
(c) means under the control of said secondary circuit of said current transformer for controlling the trigger pulses of said pulse generator to compel at any given point of time selective triggering of only said first auxiliary thyristor and of only said second auxiliary thyristor depending on the direction of current flow in said secondary circuit.

9. A tap-changing circuitry as specified in claim 1 including (a) a current transformer having a primary circuit energized by the current flowing in said second branch and having a secondary circuit;
(b) a current sensing device converting A-C currents flowing in said secondary circuit of said current transformer into corresponding D-C signals; and
(c) trigger pulse generating means responsive to said current sensing device for triggering said auxiliary thyristor to initiate discharge of said commutating capacitor through said auxiliary thyristor to cause turn-off of said load thyristor.

10. A tap-changing circuitry as specified in claim 1 wherein said D-C power supply includes an insulating transformer having a primary winding shunted across said pair of relatively movable contacts of said short-circuiting switch and a secondary circuit energizing a rectifier conductively connected to said commutating capacitor, the connection between said rectifier and said commutating capacitor including a resistor and said primary winding of said insulating transformer being shunted by a capacitor.

11. A tap-changing circuitry as specified in claim 1 wherein a quick blowing fuse is interposed between said first branch and said load-current-carrying conductor.

12. A tap-changing circuitry as specified in claim 1 wherein said second branch includes a resistor connected in series with said short-circuiting switch.

References Cited

UNITED STATES PATENTS

| | | | |
|---|---|---|---|
| 3,358,219 | 12/1967 | Bühler | 323—43.5 |
| 3,436,646 | 4/1969 | Prescott | 323—43.5 |

FOREIGN PATENTS

| | | |
|---|---|---|
| 1,277,437 | 9/1968 | Germany. |

OTHER REFERENCES

"A Silicon-Controlled Rectifier Inverter With Improved Commutation" by McMurray and Shattuck; Communication and Electronics (AIEE) November 1961; copy in 321/45 c, pp. 1–11 relied upon.

LEE T. HIX, Primary Examiner

G. GOLDBERG, Assistant Examiner

U.S. Cl. X.R.

317—15; 323—54, 91